United States Patent [19]
Gotoh et al.

[11] Patent Number: 5,143,569
[45] Date of Patent: Sep. 1, 1992

[54] METHOD FOR MANUFACTURING A THREE DIMENSIONAL LAMINATE FROM DOUBLE PILE FABRICS

[75] Inventors: Hajime Gotoh; Tadasi Yokoti, both of Nagoya, Japan

[73] Assignee: Mitsubishi Rayon Co., Ltd., Tokyo, Japan

[21] Appl. No.: 662,505

[22] Filed: Feb. 28, 1991

Related U.S. Application Data

[63] Continuation of Ser. No. 385,230, Jul. 26, 1989, abandoned.

[30] Foreign Application Priority Data

Jul. 29, 1988 [JP] Japan .................. 63-191564

[51] Int. Cl.⁵ .................. B32B 5/08; B32B 5/12; B32B 7/04; D03D 27/10
[52] U.S. Cl. .................. 156/148; 156/72; 139/383 R; 139/391; 139/420 R; 428/86; 428/96
[58] Field of Search .................. 156/72, 148, 66, 292; 139/384 R, 387 R, 384 B, 411, 408, 383 R, 391, 392, 394, 404, 420 R; 428/119, 86, 96; 264/257, 258

[56] References Cited

U.S. PATENT DOCUMENTS

| | | | |
|---|---|---|---|
| 2,349,975 | 5/1944 | Mackenzie | 428/119 X |
| 3,591,444 | 7/1971 | Hoppe . | |
| 3,940,524 | 2/1976 | Hoppe . | |
| 4,001,478 | 1/1977 | King | 139/408 X |
| 4,239,829 | 12/1980 | Cohen | 428/86 |
| 4,786,453 | 11/1988 | Berger . | |
| 4,837,065 | 6/1989 | Dow | 428/119 X |
| 4,888,228 | 12/1989 | Sidles | 156/72 X |

FOREIGN PATENT DOCUMENTS

| | | | |
|---|---|---|---|
| 0356930 | 3/1990 | European Pat. Off. . | |
| 1270789 | 6/1968 | Fed. Rep. of Germany . | |
| 3615991 | 11/1987 | Fed. Rep. of Germany | 428/96 |
| 1362018 | 4/1964 | France | 428/83 |
| 788793 | 1/1958 | United Kingdom | 156/148 |
| 2077786 | 12/1981 | United Kingdom | 428/86 |

OTHER PUBLICATIONS

SAMPE Journal, vol. 25, No. 3, May/Jun. 1989, pp. 51-56, Verpoest et al: "2.5D- and 3D-Fabrics for Delamination Resistant Composite Laminates and Sandwich Structures".

*Primary Examiner*—Jeff H. Aftergut
*Attorney, Agent, or Firm*—Oblon, Spivak, McClelland, Maier & Neustadt

[57] ABSTRACT

A method for manufacturing a fiber laminate used in a fiber reinforced material comprises a step for preparing double-pile fabrics made of reinforced fibers, on opposite sides of which pile is implanted. The method further comprises a step for laminating the double-pile fabrics so that pile of each of the fabrics is inserted into a layer of pile of adjacent double-pile fabrics, thereby obtaining a three-dimensional laminated form of said fabric.

2 Claims, 2 Drawing Sheets

FIG. IA
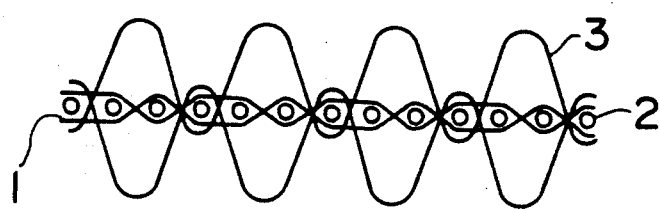
FIG. IB
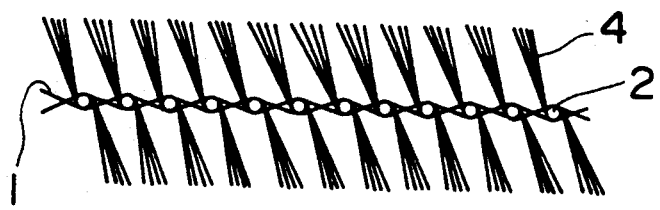
FIG. IC
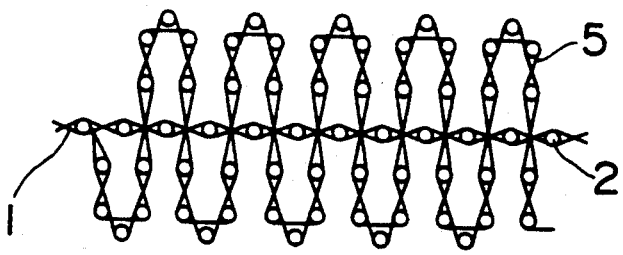
FIG. 2
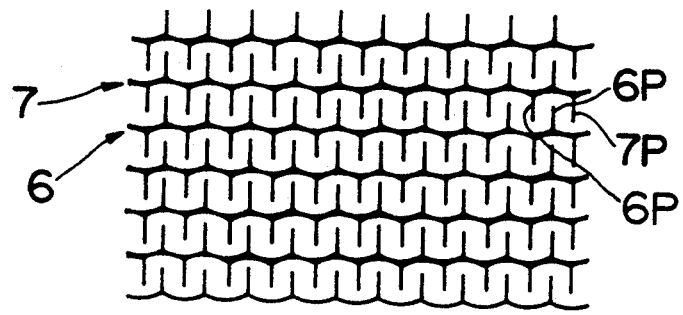

METHOD FOR MANUFACTURING A THREE DIMENSIONAL LAMINATE FROM DOUBLE PILE FABRICS

This application is a continuation of application Ser. No. 07/385,230, filed on Jul. 26, 1989, now abandoned.

FIELD OF THE INVENTION AND RELATED ART STATEMENT

The present invention relates to a method for manufacturing a fiber structure used in a fiber reinforced composite material, and particularly, to a fiber laminate which exhibits an excellent inter-layer strength.

Fiber reinforced composite materials, e.g., fiber reinforced plastic (referred to as FRP, hereinafter), fiber reinforced metal (referred to as FRM, hereinafter) and fiber reinforced ceramics (referred to as FRC, hereinafter), contain fibers as reinforcement. The fibers are used in various forms. In particular, a form which is most frequently used is a laminate of fiber sheets. Almost all of such laminates of fiber sheets have a three-dimensional structure which has a width, a length and a thickness.

However, such laminate of fiber sheets suffers from a problem that even if the reinforcement in each sheet exists in two directions in one plane, it doesn't exist in a direction in which the sheets are laminated. For this reason, the strength in the direction in which the sheets are laminated (referred to as Z-direction, hereinafter), that is, in the direction orthogonal to the above-described one plane, depends upon the bonding strength between matrixes or between the matrix and the reinforcing fibers. Lamination of fiber sheets makes no contribution to the improvement of the strength of the reinforcement in the Z-direction.

In order to solve the problem described above, there has been proposed a method that sheets, on surfaces of which fibers are implanted by means of electrostatic frocking, are laminated in the Z-direction to form a reinforcement having improved strength in the Z-direction. According to this method, however, the fibers thus implanted are pushed down at the time of laminating the sheets and accordingly contribute only to the improvement of the strength in the direction of the plane (or in X- and Y-directions). In addition, since the implanted fibers are only fixed to sheets by means of bonding agent, the strength in the Z-direction considerably depends on the bonding strength of the bonding agent.

As described above, since it is impossible according to the prior art to improve the strength of the interface between laminated layers, there has been proposed a reinforced structure which contains the reinforcement in three or X-, Y- and Z-directions, that is, a three-dimensional fabric. However, this method has a disadvantageous point that there exists no technique applicable to mass production of the three-dimensional fabric.

OBJECT AND SUMMARY OF THE INVENTION

An object of the present invention is to provide a method for manufacturing a novel laminate structure which contains reinforcement in X-, Y- and Z-directions and which is suitable for mass production.

The gist of the present invention resides in a method for manufacturing a three-dimensional laminate, comprising the steps of: laminating double-pile fabrics made of reinforced fibers in such a manner that pile of each of said pile fabrics is inserted in the layer of pile of adjacent double-pile fabric; and thereby obtaining a three-dimensional laminated form.

BRIEF DESCRIPTION OF THE DRAWINGS

FIGS. 1A to 1C are illustrations showing structures of double-pile fabrics used in the present invention;

FIG. 2 is a view showing how the fabrics are laminated;

DETAILED DESCRIPTION OF PREFERRED EMBODIMENTS

Figure 3:
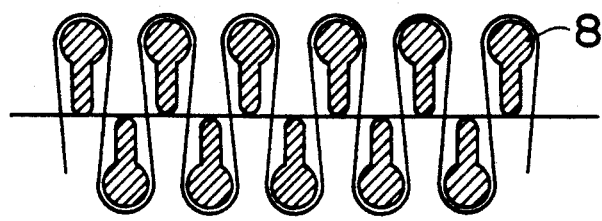
FIG. 3 is a view of a pile structure with linear pieces held in the pile.

The present invention will be described below concretely with reference to the accompanying drawings.

FIGS. 1A to 1C illustrate typical examples of the double-pile fabric according to the present invention.

FIG. 1A shows a section of a fabric on opposite sides of which piles are provided, i.e. a double-pile fabric. There fabrics are used, for example, for towel. In the drawings, a reference numeral 1 denotes warp, 2 denotes weft, and 3 denotes pile yarn. In the present invention, each yarn is usually made of reinforced fiber such as glass fiber, graphite fiber, aramid fiber and other like. The choice of reinforced fiber depends upon the requisite properties of FRP.

The double-pile fabric shown in FIG. 1A has loop pile 3 formed on opposite surfaces thereof. Such loop-pile can be obtained by interweaving linear pieces, e.g., bar pieces of the size corresponding to that of the pile as weft in addition to the weft 2 and then drawing out the bar pieces after formation of the pile. It is also possible to manufacture such double-pile fabric by making use of a towel weaving machine.

FIG. 1B shows another double-pile fabric which uses cut-piles 4 in place of the loop-pile. This fabric can be obtained by cutting a portion of the loop-pile shown in FIG. 1A, for example. It is also possible to make use of corduroy texture.

FIG. 1C shows still another double-pile fabric in which cross-pile 5 is wove cloth. This fabric can be manufactured as well by making use of the towel weaving machine.

The weaving structure of the pile fabric shown in FIGS. 1A to 1C, which is made by interlacing the warp and the weft, can be made in various forms in accordance with the requisite physical properties of the laminate made of laminated pile fabrics described above in regard to the X- and Y-directions.

On the other hand, the pile on opposite surfaces of the fabric can be also made in various forms in accordance with the requisite physical properties of the laminate made of laminated these pile fabrics in regard to the Z-direction.

The height of the pile is preferably set to be not smaller than 1 mm for ensuring the laminated structure.

The procedure for laminating the double-pile fabrics shown in FIGS. 1A to 1C will be explained with reference to FIG. 2.

First, a double-pile fabric 6 having pile 6P formed on both surfaces thereof are prepared. Another double-pile fabric 7 is so laminated that pile 7P of the fabric 7 is inserted between piles 6P and 6P of the fabric 6.

In the implantation method which has conventionally been employed for improving the strength of the interface between superposed layers the strength of the interface depends upon the bonding strength between fiber and resin. To the contrary, according to the present invention in which the pile fabrics are laminated, the fiber for making the pile is fixed at one or both ends thereof to the inside of a cloth assembled with yarns extending in the X- and Y-directions, so that the strength of the pile fiber can be utilized directly.

In the laminated structure described above, since the double-pile fabric has flexibility and since the elastic modulus of the yarn making the pile is generally high, laminating operation can be carried out relatively easily. In order to improve the certainty and workability of the laminated structure, it is preferable to adopt a pile structure shown in FIG. 3.

More specifically, such double-pile fabric is used that is made by interweaving linear pieces 8 in the pile structure for maintaining the shape of the pile.

The linear pieces 8 thus interwoven may be left as they are after laminating the fabrics so as to be utilized as reinforcement in the X- and Y-directions, or may be drawn out after laminating the fabrics so as to contribute to formation of spaces.

In this way, since the engagement between the piles is ensured as well as the length (depth) of engagement at the time of laminating the fabrics is increased, it becomes possible to greatly improve the strength of the interface between laminated layers.

In case that the pile is pushed down in the same manner as the prior art, the breaking stress of the interface between laminated layers is developed in the direction orthogonal to the bonded surface between the pile fibers. On the other hand, in case that the upright piles are engaged with each other likewise to the present invention, that breaking stress is developed in the direction parallel to the bonded surface. The strength of the interface between laminated layers in the orthogonal direction is dominated by the bonding strength between the pile fiber and the ground weave or by the strength of the resin adhesives, and however, the strength thereof in the parallel direction depends upon the strength of the fiber itself so that the strength of the interface can be greatly increased.

Figure 4:
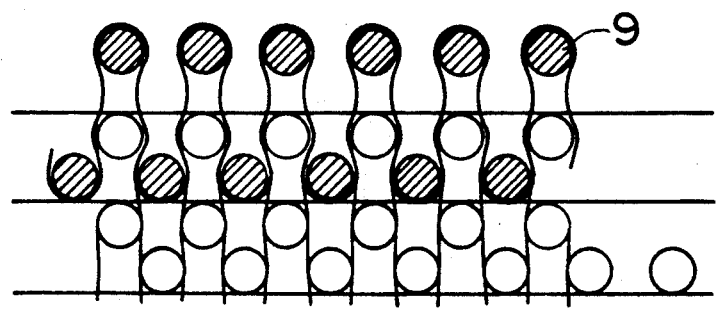
FIG. 4 is a view of a laminated structure which provides the fastener effect.

Further, in case that, as shown in FIGS. 3 and 4, linear pieces 8 and 9 of a size larger than the distance between adjacent linear pieces are engaged with each other, it is possible to provide the fastener effect between the laminated fabrics (for example, it is possible to open from one end as in the case of slide fastener but it is impossible to simultaneously detach the adjacent superposed fabrics from each other), thereby showing a great effect on improvement of the strength in the direction in which the fabrics are laminated.

The configuration of the linear pieces serving to provide the fastener effect is not particularly limited. Any sectional configuration is applicable such as a combination of circle and rectangle shown in FIG. 3, which is describable as a keyhole shape, and a circle shown in FIG. 4. However, in order not to apply the shearing stress to the pile fiber, it is preferable to use the linear pieces of the sectional configuration which has fewer sharp edge portions.

A preferred embodiment of the present invention will be described below concretely.

Figure 5:
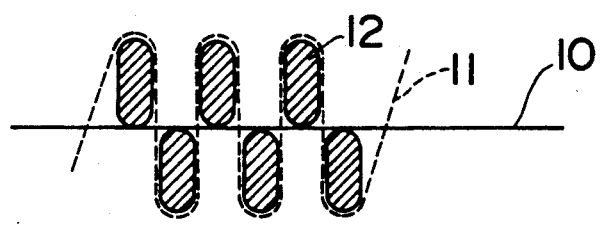
FIG. 5 is a sectional view of a plain woven double-pile structure.

A plain weave pile structure shown in FIG. 5 is obtained, that is, 6K tows of carbon filaments used as tension warp 10 and 3K tows of carbon filaments used as pile warp 11 are extended on a loom both at a density of 12.5 ends/inch. The linear pieces are interwoven as weft 12 at a density of 50 picks/inch, each of which has a flat sectional configuration of 0.3 mm width and 1.8 mm height and is made of carbon fiber reinforced epoxy matrix that contains about 55% fiber in volume. Thus a double-pile fabric of about 30 cm width with loops of about 2 mm height formed on both surfaces thereof is obtained. Five double-pile fabrics thus obtained are superposed in the same manner as shown in FIG. 2 to thereby make a laminate of about 10 mm thickness, 30 cm width and 30 cm length.

Ten laminates thus made are prepared and impregnated with epoxy resin by means of hot melting method, respectively. All of them are laminated with each other to make a three-dimensional laminated structure impregnated with epoxy resin of the size of about 10 cm thickness, 30 cm width and 30 cm length. Subsequently, epoxy resin is hardened by means of autoclaving, thus obtaining three-dimensionally reinforced FRP which is reinforced in the direction of three dimensions.

By utilizing the method for manufacturing a laminate according to the present invention, it is possible to economically manufacture the three-dimensionally reinforced structure which exhibits an excellent strength of the interface between laminated layers irrespective of its laminated structure, without making use of any special machine. Further, concerning the impregnation of the laminate with resin or the like, the planar double-pile fabrics can be impregnated with resin one by one or in a lump with a relatively small thickness of not larger than 10 plies or so, and subsequently, these fabrics thus impregnated with resin can be laminated. Accordingly, the impregnation of the matrix which has conventionally been called in question from the viewpoint of the technique for obtaining the three-dimensional structure, can be carried out easily. In consequence, the present invention is very useful as a method for manufacturing a structure for carbon/carbon composite.

What is claimed is:

1. A method for manufacturing a three dimensional laminate form having a fastening effect, comprising the steps of:

preparing double-pile fabrics made of reinforced fibers having pile yarn running in a warp direction defining a warp pile;

said fabrics containing linear pieces each having a longitudinal axis around which the wrap pile is looped, said linear pieces being located alternately below and above a plane of the fabric from out of which the pile extends, and capable of fixing a configuration of the pile, each loop of the warp pile enclosing a linear piece, spaces between the loops being unoccupied;

laminating said fabrics so that pile of each said fabrics is inserted in unoccupied spaces in a layer of the pile of an adjacent one of said double-pile fabrics thereby obtaining a three dimensional laminated form;

with a result that the loops of the pile of each fabric lie between the loops of the pile of the adjacent fabric;

wherein said linear pieces all on the same side of the plane of the fabric are spaced from each other in a direction parallel to the plane of the fabric defining a spacing perpendicular to the longitudinal axis of the linear pieces, said spacing having a distance smaller than the largest cross sectional dimension parallel to the plane of the fabric of said linear pieces to achieve a fastening structure between at least two of said fabric which have been laminated.

2. A manufacturing method according to claim 1, wherein the linear pieces have a cross-sectional section, wherein the cross-sectional shape of each of said linear pieces is a circular shape or a key hole shape.

* * * * *